(12) United States Patent
Bai et al.

(10) Patent No.: US 8,654,849 B2
(45) Date of Patent: Feb. 18, 2014

(54) INTEGRATED TRANSCODING

(75) Inventors: Jungfeng Bai, Atlanta, GA (US); John Hartung, Mableton, GA (US); Sam John, Stone Mountain, GA (US); Santhana Krishnamachari, Mabelton, GA (US); Tse Hua Lan, Atlanta, GA (US); Joe Monaco, Cary, NC (US); Ramesh Panchagnula, Smyrna, GA (US); Alexander D. Raji, Alpharetta, GA (US)

(73) Assignee: ARRIS Enterprises, Inc., Suwanee, GA (US)

(*) Notice: Subject to any disclaimer, the term of this patent is extended or adjusted under 35 U.S.C. 154(b) by 473 days.

(21) Appl. No.: 12/644,814

(22) Filed: Dec. 22, 2009

(65) Prior Publication Data

US 2010/0158126 A1 Jun. 24, 2010

Related U.S. Application Data

(60) Provisional application No. 61/139,951, filed on Dec. 22, 2008.

(51) Int. Cl.
*H04N 11/02* (2006.01)

(52) U.S. Cl.
USPC . 375/240.16; 370/389; 370/509; 375/240.01; 375/240.26; 375/240.27; 375/240.28; 375/354

(58) Field of Classification Search
None
See application file for complete search history.

(56) References Cited

U.S. PATENT DOCUMENTS

| 5,805,220 | A | * | 9/1998 | Keesman et al. | 375/240.01 |
|---|---|---|---|---|---|
| 6,233,238 | B1 | * | 5/2001 | Romanowski et al. | 370/389 |
| 6,330,285 | B1 | * | 12/2001 | Crosby et al. | 375/240.28 |
| 6,330,286 | B1 | * | 12/2001 | Lyons et al. | 375/240.28 |
| 6,748,020 | B1 | * | 6/2004 | Eifrig et al. | 375/240.26 |
| 6,970,526 | B2 | * | 11/2005 | Min | 375/354 |
| 7,298,741 | B2 | * | 11/2007 | Hung | 370/389 |
| 7,869,467 | B2 | * | 1/2011 | Otsuka | 370/509 |
| 2002/0094031 | A1 | * | 7/2002 | Ngai et al. | 375/240.27 |
| 2003/0043923 | A1 | * | 3/2003 | Zhang et al. | 375/240.27 |
| 2004/0114817 | A1 | * | 6/2004 | Jayant et al. | 382/239 |
| 2007/0140342 | A1 | * | 6/2007 | Karczewicz et al. | 375/240.12 |
| 2008/0019398 | A1 | * | 1/2008 | Genossar et al. | 370/498 |

* cited by examiner

*Primary Examiner* — Tung Vo
*Assistant Examiner* — Luis M Perez
(74) *Attorney, Agent, or Firm* — Troy A. Van Aacken

(57) ABSTRACT

Methods and systems for integrated transcoding on a plurality of data channels to convert one or more data channels from an incoming encoding format to an outgoing encoding format are disclosed.

17 Claims, 15 Drawing Sheets

INTEGRATED TRANSCODING

RELATED APPLICATIONS

This application claims priority under 35 U.S.C. §119(e) to the benefit and filing date of U.S. Provisional Patent Application Ser. No. 61/139,951, entitled "Integrated Transcoding," filed on Dec. 22, 2008, which is incorporated herein by reference in its entirety.

TECHNICAL FIELD

This disclosure relates to transcoding for streaming media.

BACKGROUND

The past decade has seen the rapid emergence of multi-media data transmitted across networks, and particularly the transmission of digital video, to provide services such as video-on-demand, digital television broadcasts, and video content distribution. Digital video, however, contains an enormous amount of data in its raw or uncompressed state, making video compression both necessary and enabling for the delivery of video content. Further, content providers, publishers, or broadcasters need to convert, combine and send, or multiplex, multiple channels of compressed video data into a single output stream with a fixed bit rate in real-time or near real-time. Accordingly, there is a need in the art for systems, methods, and computer program products to optimally convert between encoding formats while allocating a fixed number of bits among a single or multiple channels of multi-media data.

SUMMARY

Disclosed are systems, methods, and computer program products for converting multi-media programs, between encoding formats. Multi-media programs can comprise one or more of video, audio, data, and the like, elementary streams. Elementary streams can each be comprised of successive packets, each packet comprising a fixed number of bits including signaling and timing bits, hereafter referred to as header bits, and sequences of bits constituting subsequences of the video, audio, data, and the like information. The elementary stream packets can be multiplexed to form a single program transport stream. Conversion methods can modify the video and/or audio elementary stream sample rates, encoding standards, encoding bit rates, and the like. Hereafter this shall be referred to as transcoding. For example, the video elementary stream encoding bit rate can be transcoded such that a specified bitrate is obtained for a converted multi-media program while maintaining a required output timing.

Further disclosed are systems and methods for jointly transcoding a plurality of multi-media programs in an integrated transcoding system. The system can comprise a plurality of transcoders, a multiplexer, and a closed loop rate controller. The methods can comprise receiving one or more multi-media programs through a plurality of data channels, calculating an encoding complexity for each of the one or more multi-media programs, transmitting the one or more multi-media program complexities to a closed loop rate controller, performing a transcoding operation on the one or more multi-media programs, wherein the transcoding operation includes filtering based on filter attributes selected by a plurality of transcoders and a closed loop rate controller and multiplexing the plurality of transcoded multi-media programs to form a multiple program transport stream.

Performing a transcoding operation can comprise, decoding, by an input decoder, a video elementary stream demultiplexed from a program transport stream, resulting in decoded video and input encoding parameters; converting the input encoding parameters, by an input/output parameter translator, into estimates of the transcoded video elementary stream parameters; generating, by a First Pass Encoder, estimates of frame coding modes and approximate motion vectors based on the decoded video and estimates of the transcoded video elementary stream parameters; buffering the decoded video and input encoding parameters for all frames in a look-ahead buffer; performing adaptive filtering to improve output encoding quality by reducing a required number of encoding bits through removal of noise and less-observable details; allocating, by an output encoder rate control, encoding bits to frames within the look-ahead buffer; and calculating, by an output encoder, the transcoded video elementary stream.

In an aspect, adaptive filtering can comprise computing, by the plurality of transcoders, complexity information of the plurality of transcoders respective channels and sending the complexity information to the closed loop rate controller; estimating, by the closed loop rate controller, encoding bit rate information for each of the plurality of transcoders; receiving, by the plurality of transcoders, the encoding bit rate information from the closed loop rate controller; and combining, by the plurality of transcoders, the complexity information with the encoding bit rate information to select filtering attributes. The complexity information can include, but is not limited to, information about timing, frame type, and bit requirements for one or more frames. The filtering attributes can comprise a strength of filtering, a nature of filtering, and the like. Examples of strength of filtering can include, but are not limited to, the degree of attenuation in the stopband of a lowpass spatial filter Examples of nature of filtering can include, but are not limited to, filtering in the spatial domain and filtering in the temporal domain.

In an aspect, frame bit allocation for each channel can be controlled by the closed loop rate controller. In another aspect, bit allocation to each channel can be controlled by an output encoder rate control unit as part of the transcoder.

Decoding input multi-media elementary stream can comprise an entropy decoder recovering original encoding parameters; and a decoding loop reconstructing multi-media frames.

The methods can further comprise improving output encoding quality by determining detail observability by a Feature Extraction method that incorporates a human visual system model (HVS). In an aspect, noise can be estimated from input encoding parameters and decoded media.

In an aspect, the methods can be used for transcoding where input media compression standard is different from the out media compression standard. In another aspect, the input media compression standard can be the same as the output media compression standard.

The methods can further comprise dynamically reusing parameters of an input elementary stream. In an aspect, dynamically reusing parameters can comprise receiving parameters at a chosen level of granularity; analyzing parameters at the chosen level of granularity; comparing parameters for an encoder-parameter approach and a decoder-parameter approach; and choosing either the encoder-parameter or the decoder-parameter approach based on the comparison at the chosen level of granularity. In a further aspect, dynamically reusing parameters can comprise implementing both the encoder-parameter approach and the decoder-parameter approach; comparing performance of both the encoder-parameter approach and the decoder-parameter approach at a chosen granularity level; and choosing either encoder-parameter approach or decoder-parameter approach based on performance.

In an aspect, the output bit rate can be constant.

The transcoding operation can be closed loop transcoding. Closed loop transcoding can comprise a closed loop controller receiving complexity estimate for each input elementary stream being transcoded and multiplexed; the closed loop controller assigning an encoding rate to each input elementary stream; and the transcoder converting input elementary stream to output media format at the specified rate.

The methods can further comprise timing recovery and tracking Timing recovery and tracking can comprise receiving a sequence of packets from an elementary stream, wherein each packet header field includes a program clock reference (PCR) indicator bit signaling the presence of an optional PCR field containing the PCR value at the time instant, within the program transport stream, of the elementary stream packet subsequence containing the video, audio or data information; storing the PCR field of each received packet having a PCR indicator bit signaling the presence of a PCR field in a FIFO memory; storing a sample of a locally generated PCR coincident with the reception of an elementary stream packet containing a PCR field; estimating the clock count of the original PCR from the locally generated clock by comparing the stored clock samples thereby forming a locally generated PCR; delaying the locally generated PCR so that its samples are coincident with the original elementary stream PCRs which have been delayed by the transcoder; and inserting samples of the locally generated PCR clock into the outgoing elementary stream. Timing recovery and tracking involves using a stable local clock with a frequency equal or higher than 27,000,000 Hz to generate the local PCR clock.

In an aspect, a clock count of the locally generated PCR clock can be a linear function of a clock count of the original PCR clock. A local PCR clock sample can be generated by counting cycles of a Local Clock in a 64-bit counter and by multiplying the count value ($\omega_{PCR}$) by a factor $\beta$ and adding the factor $\alpha$ to form the local PCR value ($\omega_{local}$). An $\alpha,\beta$ Estimator uses previous values of local and original PCR values held in first-in-first-out memories to determine values of $\alpha$ and $\beta$ to generate a local PCR clock synchronous with the original PCR clock. The number of rollovers of PCR clock is accounted to produce a contiguous increasing value for $\omega_{PCR}$. And data points falling outside 3-sigma (99.8% confidence) inter-arrival range can be rejected in order to avoid excessive error.

A value for a PCR clock advance per transport packet can be calculated by monitoring a number of transport packets between consecutive PCR values. The transport packets can be clustered as 7 packets within a single data-gram IP packet, and the calculated PCR clock advance per transport packet value is then used to estimate clock count for each packet in the cluster.

In an aspect, a regression operation can be performed over a large set of $\omega_{local}$ and $\omega_{PCR}$ pairs to co-relate the two sets of clock to obtain approximate values of slope ($\beta$) and offset ($\alpha$). The number of samples used in regression calculations can be limited by discarding the oldest sample and replacing it with newest. The number of samples can be limited when a desired accuracy is achieved and the number of samples is increased if more PCR value accuracy is needed. Furthermore, round off error is contained by calculating values of $\alpha$ and $\beta$ using averages instead of sums.

Provided are integrated transcoding systems for performing the methods disclosed herein. In an aspect, the integrated transcoding system can comprise a plurality of transcoders, a closed loop rate controller (also referred to as "closed loop controller"), and a multiplexer for multiplexing a plurality of streams from a plurality of data channels. Each of the plurality of transcoders can further comprise a demultiplexer, an audio delay module, a video delay module, a video transcoder, a PCR timing recovery module, a transcoding delay module, and a PCR insertion module.

BRIEF DESCRIPTION OF THE DRAWINGS

The accompanying drawings, which are incorporated in and constitute part of this specification, illustrate embodiments of the methods and systems, and together with the description, serve to explain the principles of the methods and systems. The embodiments described in the drawings and specification in no way limit or define the scope of the present methods and systems.

DETAILED DESCRIPTION OF EMBODIMENTS

Figure 1:
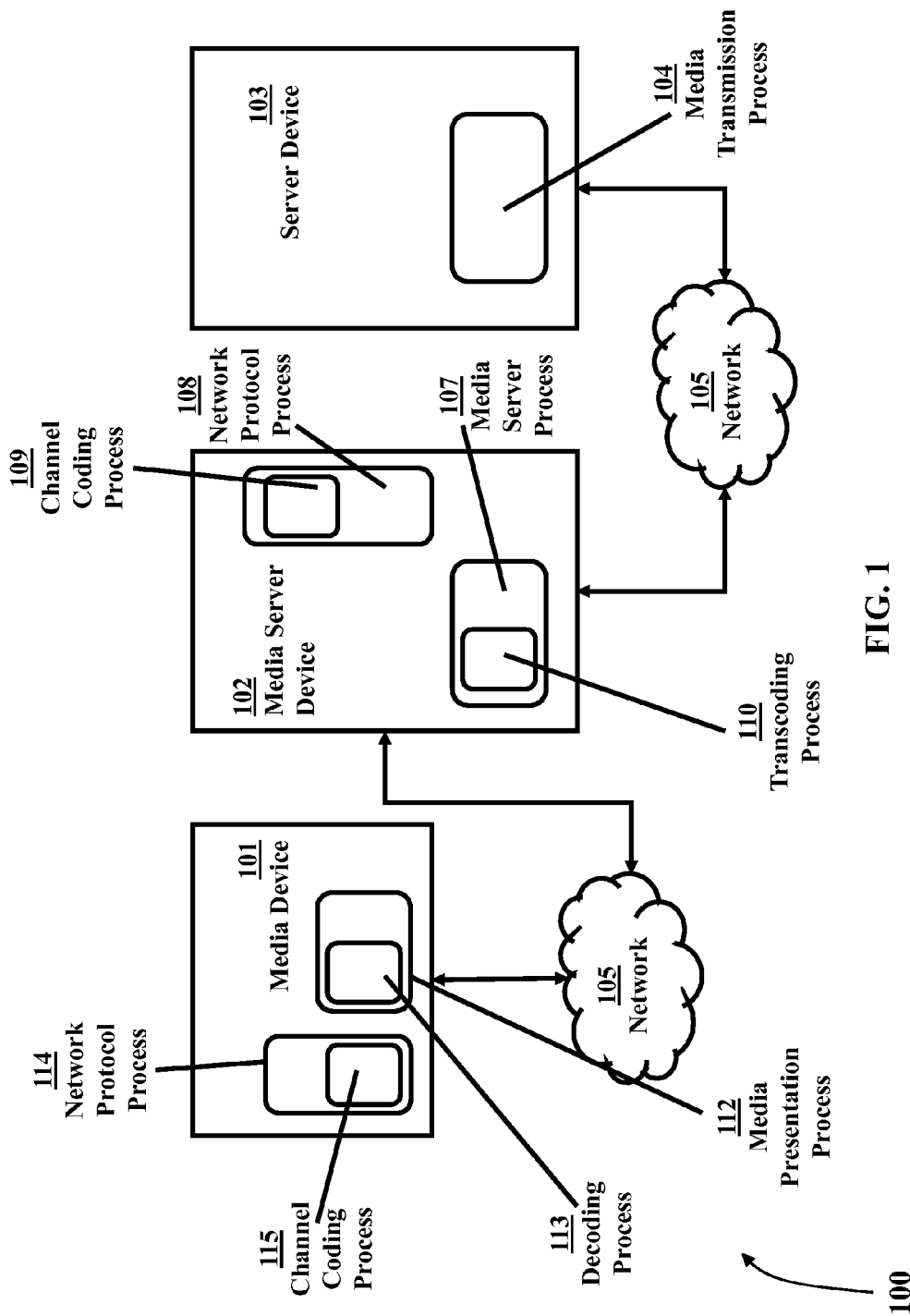
FIG. 1 is a block diagram that illustrates a system for delivering multi-media data using computer hardware over a network.

Before the present methods, systems, and computer program products are disclosed and described, it is to be understood that the methods and systems are not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Thus, for example, reference to "a transcoder" includes mixtures of transcoders, reference to "a transcoder" includes mixtures of two or more such transcoders, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Unless otherwise expressly stated, it is in no way intended that any method or embodiment set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification. Furthermore, while various embodiments provided in the current application refer to the statutory classes of methods, systems, or computer program products, it should be noted that the present methods, systems, or computer program products may be carried out, embodied, or claimed in any statutory class.

Multi-media data takes many forms known in the art, including audio, picture, and video data. For example, picture data is stored as files of binary data using various raw or compressed formats including GIF, JPEG, TIFF, BMP, and PDF. Audio data includes waveform audio (WAV), MP3, audio interchange file format (AIFF), musical instrument digital interface (MIDI), and sound files (SND). Video data includes QuickTime and the Motion Picture Experts Group format (MPEG). Further treatment of the subject is provided in the book Video Communication, (1) Image and Video Compression Standards, V. Bhaskaran and K, Konstantinides, Kluwer Academic, 1995, hereby incorporated by reference in its entirety.

In some embodiments multimedia data can be combined in an MPEG multimedia transport stream comprising audio, video, and data elementary streams that can be combined into programs. All of the elementary streams corresponding to a single program can be synchronized using an integrated program clock reference (PCR) so that all elements of the multimedia program can be decoded and displayed simultaneously. The MPEG multimedia program transport stream contains samples of the PCR as a recurring clock value field encoded within the transport stream. The nominal rate of the PCR is 27,000,000+/−810 Hz and a sample of this clock is included in the program stream at a rate equal to or greater than once every 100 mS. The rate of change (jitter) of the PCR is specified as 75×10 (−3) Hz per second. Each program in a multiprogram transport stream carries a unique PCR and all program elementary streams within that program can be synchronized to the corresponding PCR.

FIG. 1 is a diagram illustrating an exemplary system for delivering multi-media data using networked computer systems. The computer systems 101, 102, 103 and networks 105 can be of the types described in the embodiment of FIG. 3, which is discussed in more detail below. On a network 105, a process called a client process (hereinafter, simply "client") operating on one computer, called a client device, makes a request of another process called a server process (hereinafter "server") executing on a computer, called a server device 103, connected to the network 105. The server 103 performs the service, often sending information back to the client.

A server device 103 contains multi-media data and a media transmission process 104 that communicates the data over a network 105 to the media server device 102. The media server device 102 includes a media server process 107 that conditions the data for communication over network 105 to a media presentation process 112 on media client device 101. The media presentation process 112 presents the multi-media to a user.

In some embodiments, the local networks 105 may comprise a direct connection between media client device 101 and media server device 103. In other embodiments, the networks 105 include one or more transcoders that convert from one type of signal to another, and/or multiplexers that combine a plurality of data channels into one output channel. In various embodiments, the networks 105 include one or more wired, wireless, or optical links.

Networks 105 can be networks that use the Internet Protocol (IP) in various embodiments. In other embodiments, networks 105 are both non-IP networks, such as a network or satellite communication links or cable television links. On a cable television link, the media server device 102 is at the cable headend and the media client device 101 may be a television set-top box or personal computer.

The video data within the MPEG stream represents a sequence of video pictures or frames. The amount of information used in MPEG to represent a frame of video varies greatly depending on factors such as visual content including color space, temporal variability, spatial variability, the human visual system, and the techniques used to compress the video data. Video data can be transcoded into a variety of formats depending on factors such as the computing resources needed for real-time or near-real time encoding and delivery, storage limitations, bandwidth limitations, or media device 101 display limitations.

MPEG video data may be encoded using three types of picture or frame data: Intra-frame ("I-frame") data, forward Predicted frame ("P-frame") data, Bi-directional predicted frame ("B-frame") data. I-frame data includes all of the information required to completely recreate a frame. P-frame data contains information that represents the difference between a frame and the frame that corresponds to a previous I-frame or P-frame data. B-frame data contains information that represents relative movement between preceding I-frame data or P-frame data and succeeding I-frame data or P-frame data. MPEG comprises various encoding standards, including MPEG 1, MPEG 2, and MPEG 4. MPEG 2 is defined in the international standard ISO/IEC 138181, 2, and 3, and these standards are herein incorporated by reference in their entirety. MPEG 4 is defined in the international standard ISO/IEC 14496-1, 2, 3, 4, 5, 6, 7, and 8 and these standards are herein incorporated by reference in their entirety.

MPEG reduces the number of bits required to represent video data by removing spatial redundancy within a video frame (intra-frame coding) and removing temporal redundancy between successive video frames (inter-frame coding).

Each frame is made up of two interlaced fields that are alternate groups of rows of pixels. Each field is made up of multiple macroblocks (MBs). Each MB is a two dimensional array of pixels, typically 16 rows of 16 pixels. Each MB comprises four luminance blocks, typically 8 rows of 8 pixels each, and two chrominance blocks, also 8 rows of 8 pixels each. Motion compensation is used to reduce temporal redundancy, typically on a macroblock basis. Spatial redundancy is reduced using a two-dimensional spatial frequency domain transform typically on a block basis. During motion compensation, a motion vector is computed that indicates pixel locations on one or more reference frames that are the basis for a particular macroblock on a different, current frame. Differences between the reference macroblock and the particular macroblock are then computed using the spatial transform.

Each MPEG video sequence is composed of a series of Groups of Pictures (GOPs). Each GOP is composed of a series of I, P, B frames, and each GOP begins with an I frame. As known in the art, a "slice" is a series of macroblocks and may make up a field or a portion of a field.

Figure 3:
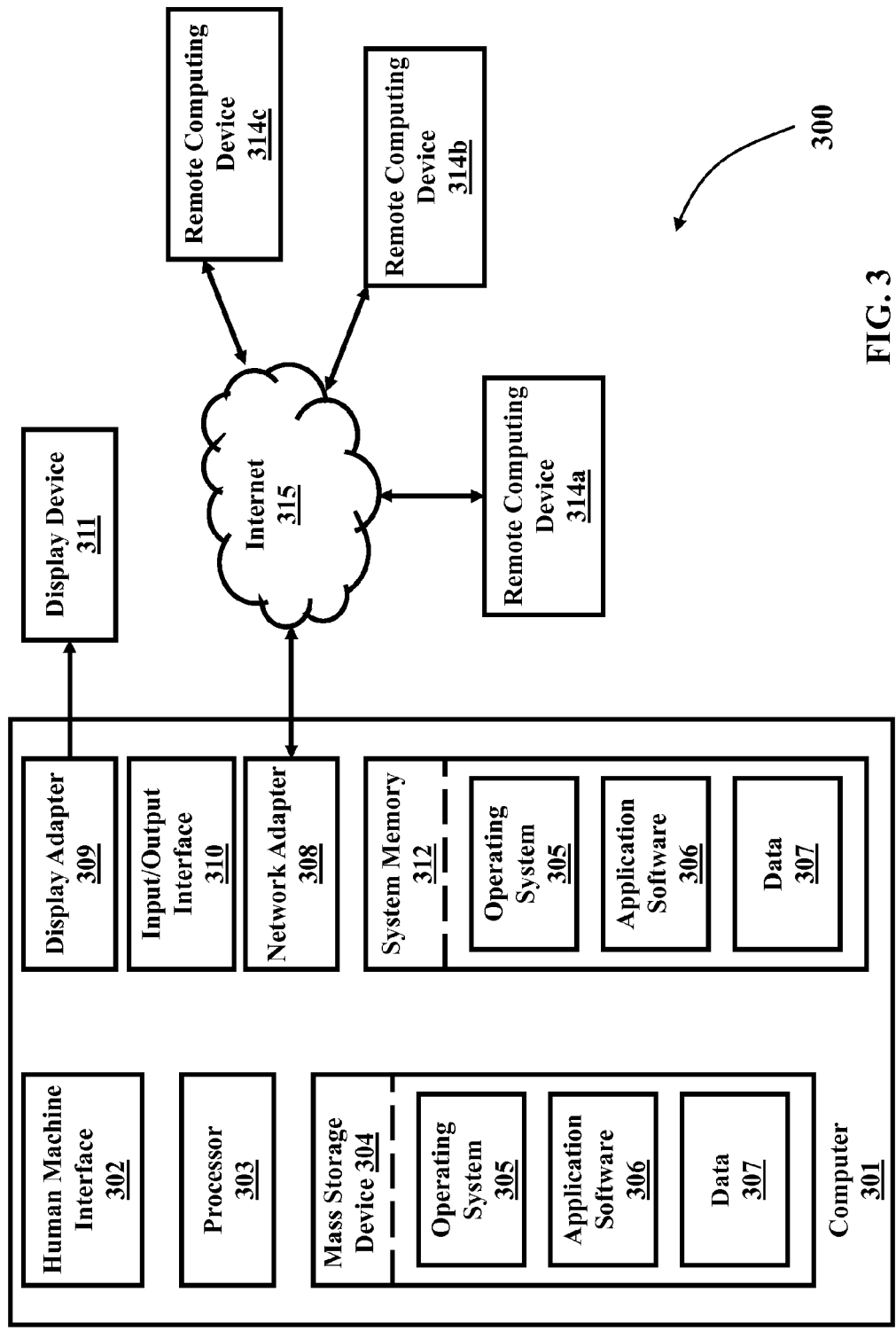
FIG. 3 is a block diagram illustrating the computer system of one embodiment of the present methods and systems.

For decoding and display, the data in the MPEG stream is sent to a client computer system such as the computer system in the embodiment of FIG. 3. For example, the MPEG stream is sent over networks 105 to media device 101. In cases where the media encoding format in Server Device 103 does not conform to the decoding and display capabilities of Media Device 101, the Transcoding Process 110 in Media Server Device 102 translates the original encoding into a compatible format.

An MPEG program stream must conform to certain criteria set forth in the MPEG standards. For example, the MPEG stream may provide a video elementary stream at 30 frames per second, but should not provide so many bits per second that a client computer's buffers overflow. Buffer overflow can be mitigated by requiring that the received MPEG stream be of a constant or maximum bit rate and by requiring that the decoder produce frames at a rate that is synchronous with the originally encoded video. MPEG data channels may also contain variable bit rate streams, wherein a set of frames such as a GOP is encoded using a variable number of total bits.

Figure 2:
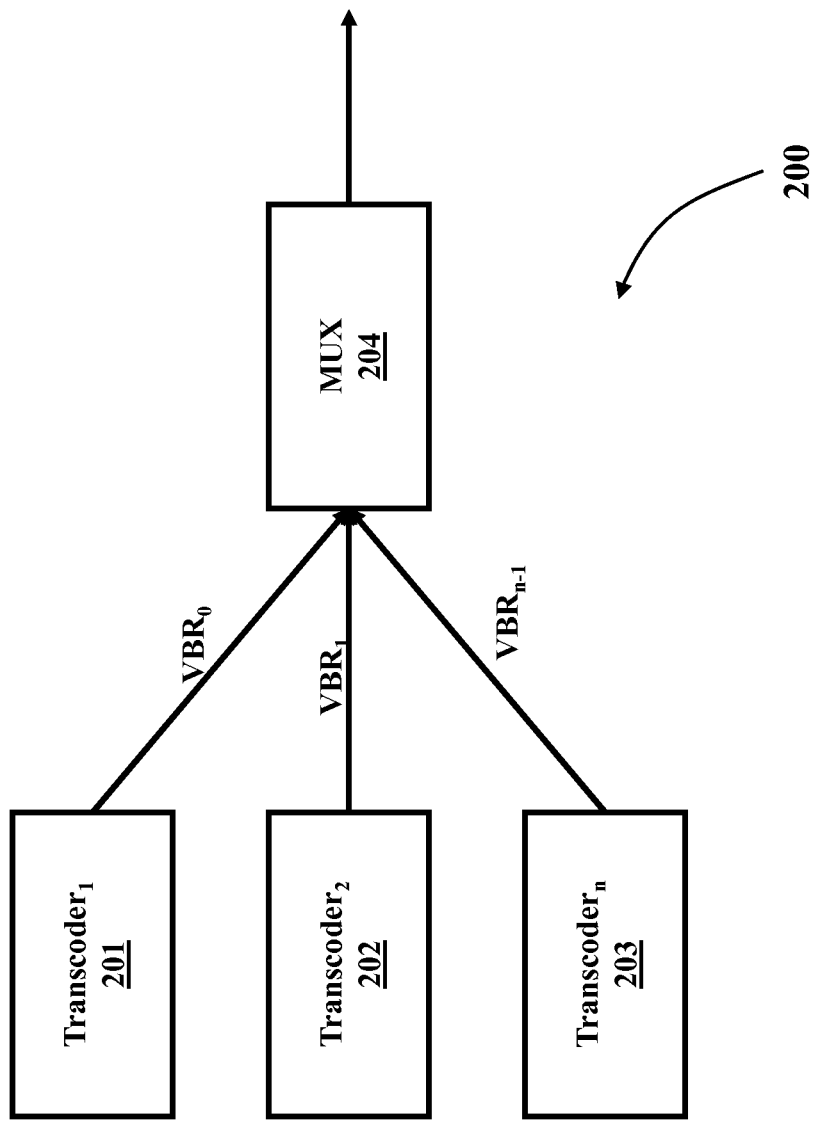
FIG. 2 is a block diagram that illustrates a plurality of transcoders sending data to a multiplexer.

Often, entities such as content providers, distributors, and publishers need to convert and optionally combine a plurality of MPEG compatible streams and transmit the output over a fixed bandwidth channel. The conversion provides compatibility with existing client display devices when the original encoding is incompatible. This can occur when a more efficient encoding format, such as MPEG4, is used for high cost communication links, such as satellite transponders, for eventual distribution to legacy client decoders, such as MPEG2 set top boxes. In the case of combining multiple channels, the individual bit rates of the channels are free to change as long as the total bit rate is fixed. FIG. 2 provides a logical overview of a group of transcoders 201, 202, 203 transcoding encoded input streams to produce a plurality of variable bit rate (VBR) output streams, which are then each input to multiplexer 204 ("mux"). The multiplexer 204 accepts the input streams, buffers data, and sends out the desired constant bit rate (CBR) data stream. Accordingly, a challenge exists in the art to optimally convert the encoding format while assigning bit rates to each transcoder so that the multiplexer can deliver the output stream at a constant bit rate with correct timing and without overflowing buffers, while at the same time optimally assigning bits to each channel to provide the best possible output quality.

Disclosed are systems, methods, and computer program products for converting between encoding formats and optionally allocating a fixed number of bits among a plurality of channels by using channel complexity data to determine the number of bits to assign to each channel. The methods can thus be carried out using a processor programmed to carry out the various embodiments disclosed. FIG. 3 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The method may also be practiced in distributed computing environments where tasks are performed by remote processing devices that are linked through a communications network. In a distributed computing environment, program modules may be located in both local and remote computer storage media including memory storage devices.

Additional advantages will be set forth in part in the description which follows or may be learned by practice. The advantages will be realized and attained by means of the elements and combinations particularly pointed out in the appended claims. It is to be understood that both the foregoing general description and the following detailed description, are exemplary and explanatory only and are not restrictive.

The method disclosed herein can be implemented via a general-purpose computing device in the form of a computer 301. The components of the computer 301 can include, but are not limited to, one or more processors or processing units 303, a system memory 312, and a system bus 313 that couples various system components including the processor 303 to the system memory 312.

The processor 303 in FIG. 3 can be an x-86 compatible processor, including a PENTIUM IV, manufactured by Intel Corporation, or an ATHLON 64 processor, manufactured by Advanced Micro Devices Corporation. Processors utilizing other instruction sets may also be used, including those manufactured by Apple, IBM, or NEC.

The system bus 313 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 313, and all buses specified in this description can also be implemented over a wired or wireless network connection and each of the subsystems, including the processor 303, a mass storage device 304, an operating system 305, application software 306, data 307, a network adapter 308, system memory 312, an Input/Output Interface 310, a display adapter 309, a display device 311, and a human machine interface 302, can be contained within one or more remote computing devices 314a,b,c at physically separate locations, connected through buses of this form, in effect implementing a fully distributed system.

The operating system 305 in FIG. 3 includes operating systems such as MICROSOFT WINDOWS XP, WINDOWS 2000, WINDOWS NT, or WINDOWS 98, and RED HAT LINUX, FREE BSD, or SUN MICROSYSTEM SOLARIS. Additionally, the application software 306 may include web browsing software, such as MICROSOFT INTERNET EXPLORER or MOZILLA FIREFOX, enabling a user to view HTML, SGML, XML, or any other suitably constructed document language on the display device 311.

The computer 301 typically includes a variety of computer readable media. Such media can be any available media that is accessible by the computer 301 and includes both volatile and non-volatile media, removable and non-removable media. The system memory 312 includes computer readable media in the form of volatile memory, such as random access memory (RAM), and/or non-volatile memory, such as read only memory (ROM). The system memory 312 typically contains data such as data 307 and/or program modules such as operating system 305 and application software 306 that are immediately accessible to and/or are presently operated on by the processing unit 303.

The computer 301 may also include other removable/non-removable, volatile/non-volatile computer storage media. By way of example, FIG. 3 illustrates a mass storage device 304 which can provide non-volatile storage of computer code, computer readable instructions, data structures, program modules, and other data for the computer 301. For example, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 304, including by way of example, an operating system 305 and application software 306. Each of the operating system 305 and application software 306 (or some combination thereof) may include elements of the programming and the application software 306. Data 307 can also be stored on the mass storage device 304. Data 304 can be stored in any of one or more databases shown in the art. Examples of such databases include, DB2®, Microsoft® Access, Microsoft® SQL, Server, Oracle®, mySQL, PostgreSQL, and the like. The databases can be centralized or distributed across multiple systems.

A user can enter commands and information into the computer 301 via an input device (not shown). Examples or such input devices include, but are not limited to, a keyboard, pointing device (e.g., a "mouse"), a microphone, a joystick, a serial port, a scanner, touch screen mechanisms, and the like. These and other input devices can be connected to the processing unit 303 via a human machine interface 302 that is coupled to the system bus 313, but may be connected by other interface and bus structures, such as a parallel port, serial port, game port, or a universal serial bus (USB).

A display device 311 can also be connected to the system bus 313 via an interface, such as a display adapter 309. For example, a display device can be a cathode ray tube (CRT) monitor or a Liquid Crystal Display (LCD). In addition to the display device 311, other output peripheral devices can include components such as speakers (not shown) and a printer (not shown) which can be connected to the computer 301 via Input/Output Interface 310.

The computer 301 can operate in a networked environment using logical connections to one or more remote computing devices 314a,b,c. By way of example, a remote computing device can be a personal computer, portable computer, a server, a router, a network computer, a peer device or other common network node, and so on. Logical connections between the computer 301 and a remote computing device 314a,b,c can be made via a network such as a local area network (LAN), a general wide area network (WAN), or the Internet. Such network connections can be through a network adapter 308.

For purposes of illustration, application programs and other executable program components such as the operating system 305 are illustrated herein as discrete blocks, although it is recognized that such programs and components reside at various times different storage components of the computing device 301, and are executed by the data processor(s) of the computer. An implementation of application software 306 may be stored on or transmitted across some form or computer readable media. An implementation of the disclosed method may also be stored on, or transmitted across some form of computer readable media. Computer readable media can be any available media that can be accessed by a computer. By way of example, and not limitation, computer readable media may comprise "computer storage media" and "communications media." "Computer storage media" include, volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 4:
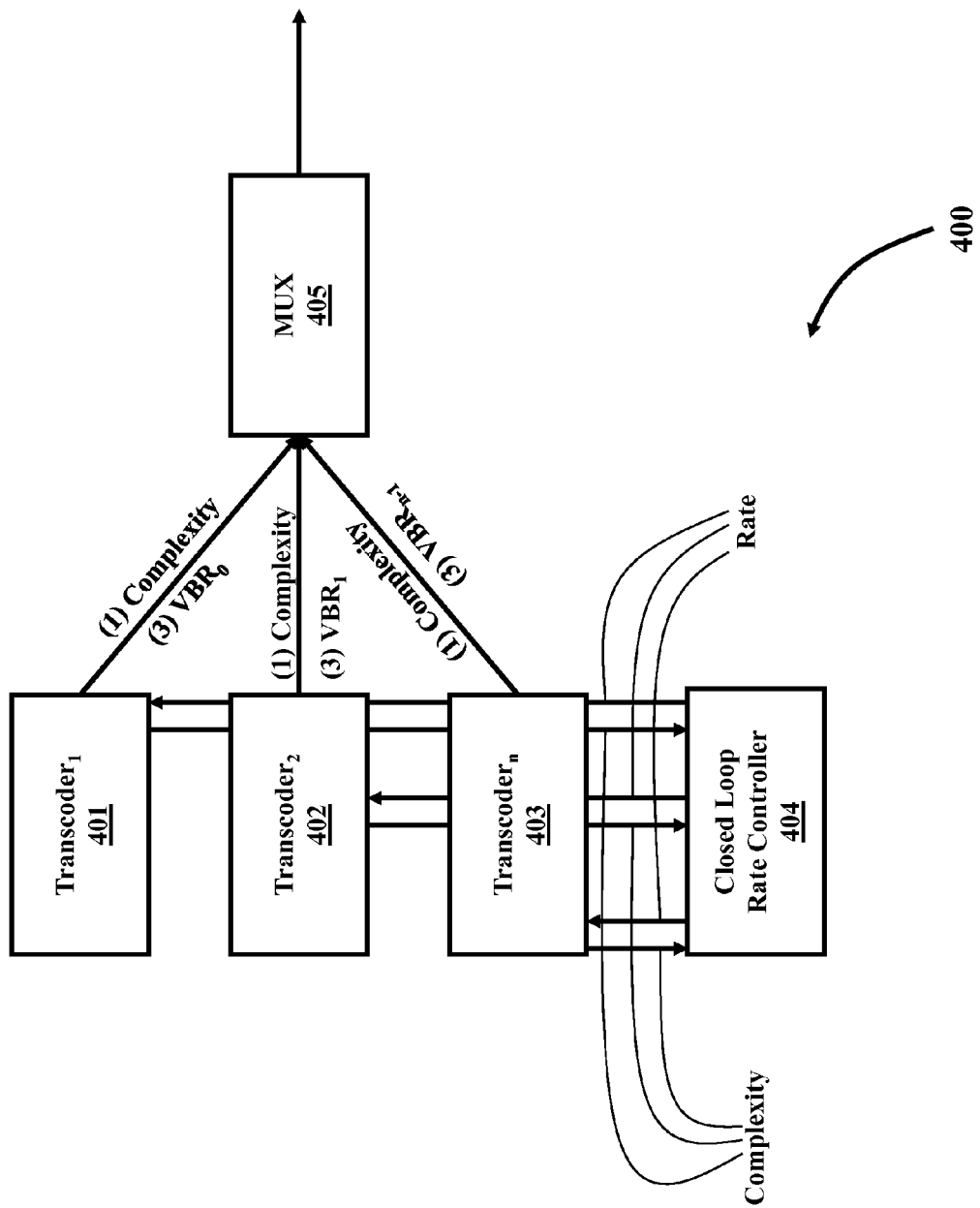
FIG. 4 is a block diagram that illustrates a plurality of transcoders processing multiple multimedia streams and re-combining them into a multiplex.

In an aspect, illustrated in FIG. 4, provided is an integrated transcoding system 400. The system can comprise a number of transcoders (each transcoder receiving as input a program transport stream), a closed-loop rate controller, and a multiplexer (MUX). Each of the plurality of transcoders (transcoder$_1$ 401, transcoder$_2$ 402, transcoder$_n$ 403) can compute the complexity of their respective input program transport streams and send that information to the closed loop rate controller (404). The closed loop rate controller (404) can receive complexity estimates for each of the program transport streams being transcoded by the plurality of transcoders, and the closed loop rate controller can assign an encoding rate to each of the transcoded program transport streams. The transcoders can estimate the amount of filtering to apply to their respective program transport streams based on the complexity estimates and the assigned encoding bit rates. For example, if the output bit rate is relatively high and the encoding complexities are small, then a transcoder can decide that there is no need to perform any filtering. On the other hand, if the complexities are high and the bit rate is relatively low, then the transcoders may perform stronger filtering to ensure that the coding artifacts in the output are masked by filtering. The resulting transcoded program transport streams can then be combined by the multiplexer which outputs a multiple program transport stream.

Figure 5:
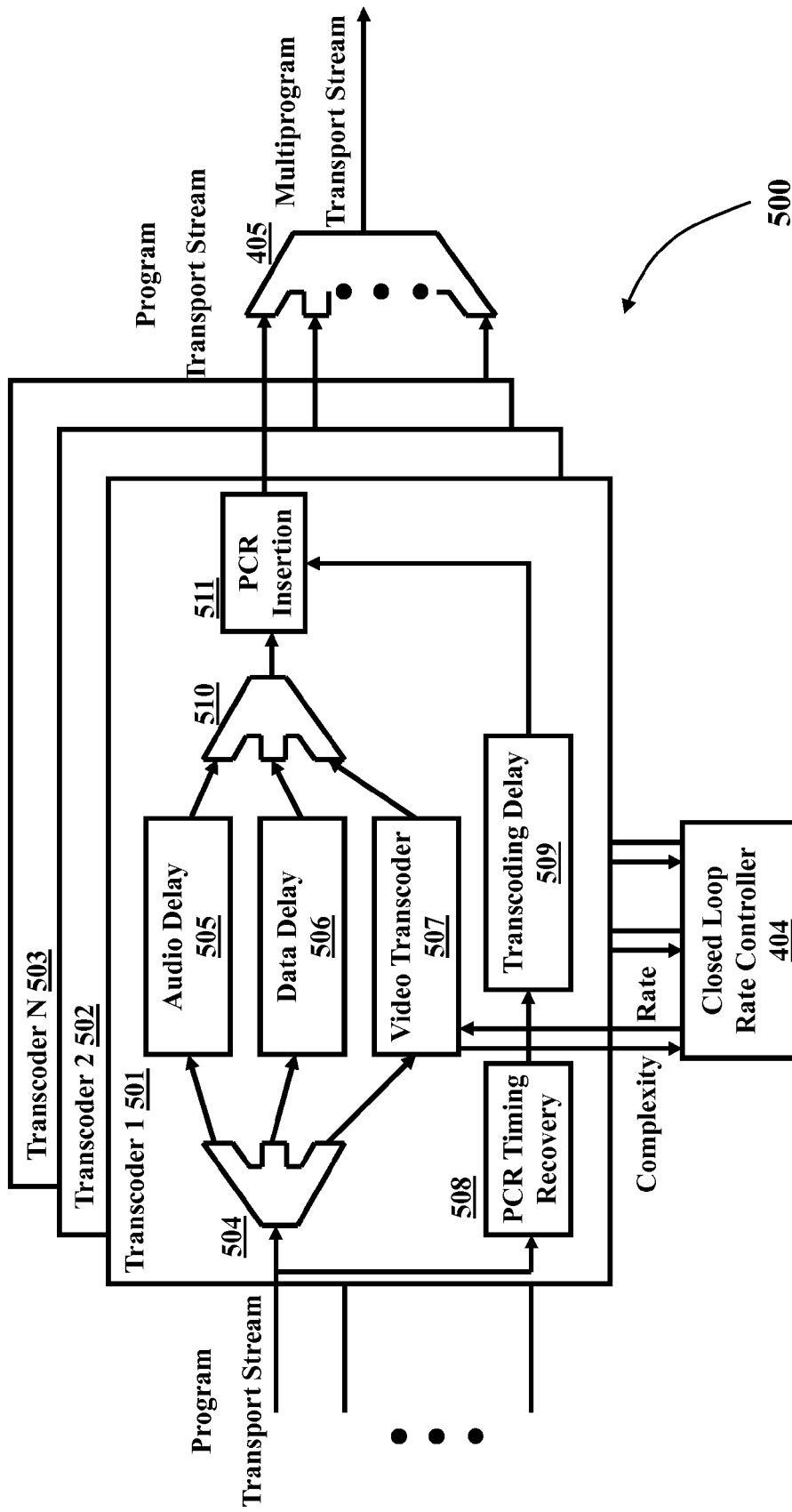
FIG. 5 is a block diagram that illustrates a plurality of transcoders sending data to a multiplexer according to an embodiment herein.

FIG. 5 is a diagram of an integrated transcoding system according to an embodiment herein. The input Program Transport Streams can be either single program transport streams or multiple program transport streams. In either case the program elementary streams corresponding to a single program can be processed by each Transcoder (501, 502, 503). The demultiplexer (504) in each transcoder can separate the elementary streams for processing by a transcoder (507) or a delay (505, 506). In the present example only the video elementary stream is transcoded. The streams can be buffered in first-in first-out memories of sufficient length to time-align the streams at the input to the re-multiplexer (510). The re-multiplexer can combine the elementary streams with a re-constructed program clock reference (PCR) to form a valid MPEG stream. The original stream rate and timing can be changed due to the operation of the Video transcoder (507); therefore the insertion time of the PCR can vary relative to the original insertion point. In order to maintain a PCR meeting the MPEG requirements a PCR Timing Recovery (508) process can be used to generate an accurate local 27 MHz PCR clock synchronous to the original PCR clock generator. A sample of the local PCR clock can be inserted in the multiplexed stream at the time a sample of the PCR value is output in the stream as required in the MPEG specification. The local PCR clock can be delayed (509) in a first-in first-out memory of sufficient length to compensate for delays in the elementary streams.

PCR Timing Recovery

In order to replicate the input PCR clock in the transcoded output stream, the transcoder can recover and track the input PCR clock within the accuracy parameters of the MPEG transport stream standard. Generally the PCR jitter of a multimedia stream received over a multimedia network can exceed the MPEG standard of 75×10 (−3) Hz making it unusable for directly time stamping the transcoded output stream. Provided herein are methods for PCR recovery and tracking that can estimate and generate a local PCR clock synchronous with the original PCR clock and can meet MPEG clock jitter and drift requirements.

Figure 6:
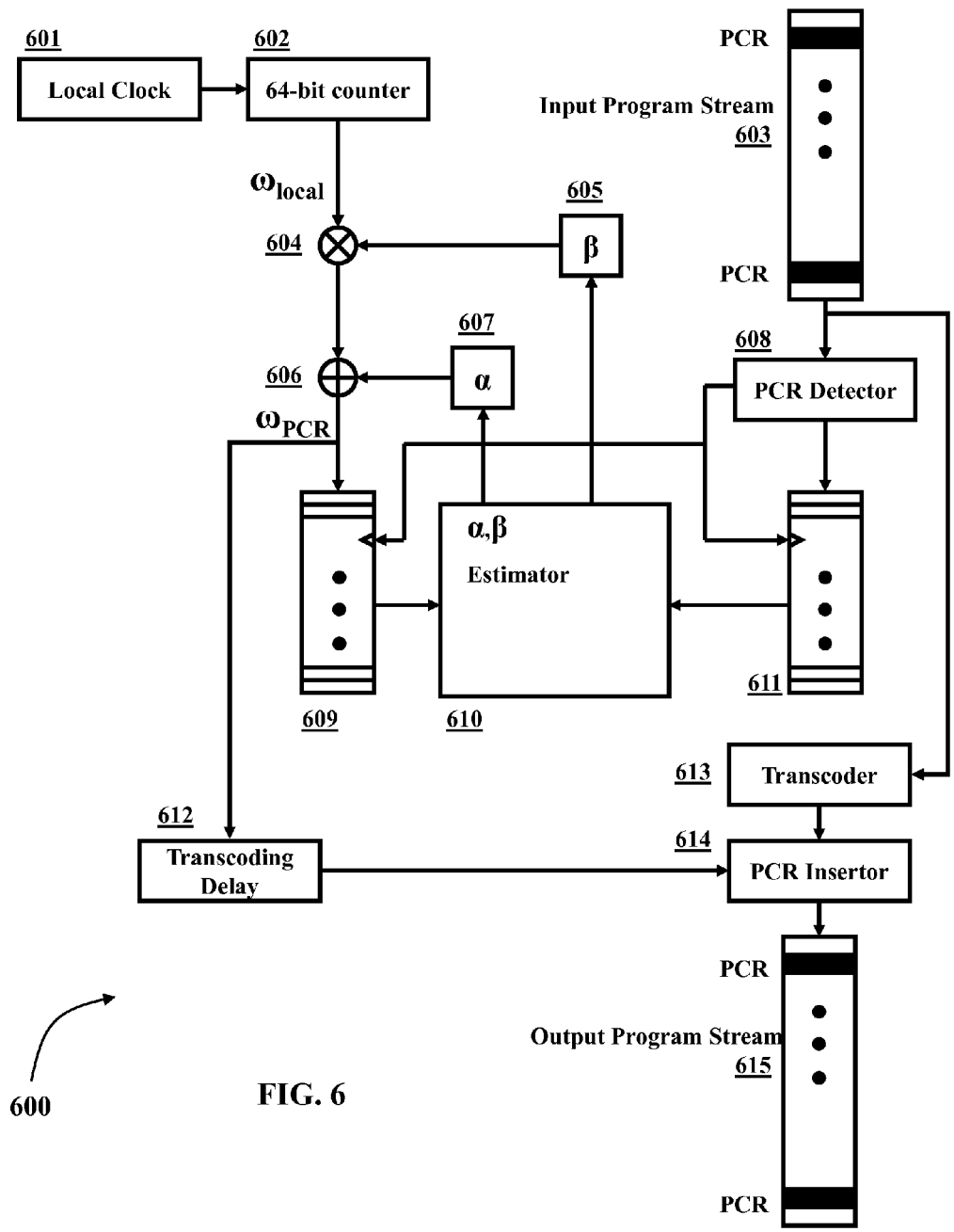
FIG. 6 is a block diagram that illustrates a system for PCR clock recovery according to an embodiment herein.
Figure 7:
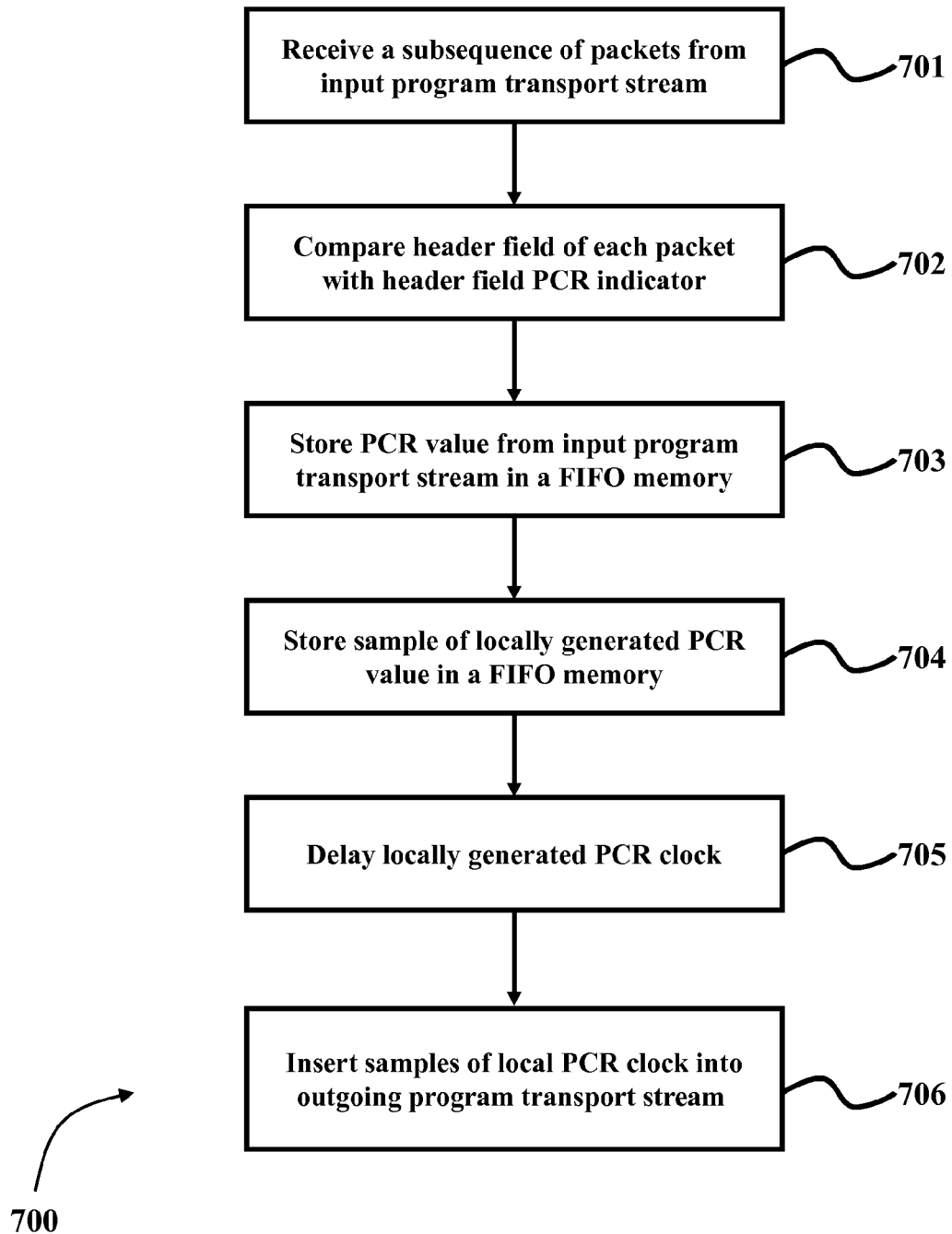
FIG. 7 is a flow diagram illustrating the PCR clock recovery process according to an embodiment herein.

FIG. 6 is a block diagram that illustrates a system for PCR clock recovery. In an aspect, illustrated in FIG. 7, provided is a method for PCR clock recovery. Block 603 shows a subsequence of packets from the input program transport stream containing PCR clock samples that can be received in 701. PCR Detector (608) can compare the header field of each received packet with the header field PCR indicator in 702, can issue a load signal, and can present the PCR value to the input of FIFO memory (611) when a PCR packet is detected. The load signal can cause the PCR value to be stored in the FIFO memory (611) in 703, and a sample of the locally generated PCR value to be stored in FIFO memory (609) in 704. The locally generated PCR value can be sampled at the same time instant as the arrival of PCR packet. The local PCR clock sample can be generated by counting the cycles of a Local Clock (601) in 64-bit counter (602), multiplying (604) the count value ($\omega_{PCR}$) by the factor $\beta$ (605), and adding (606) the factor $\alpha$ (607) to form the local PCR value ($\omega_{local}$). An $\alpha$, $\beta$ Estimator (610) can use previous values of the local and original PCR values held in FIFOs (609 and 611) to determine the values of $\alpha$ and $\beta$ to generate a local PCR clock synchronous with the original PCR clock that meets the MPEG PCR clock requirements. A method for forming these estimates of $\alpha$ and $\beta$ is described in the sections below. The PCR Inserter (614) can place samples of the local PCR clock into the outgoing program transport stream (615) at intervals required by the MPEG standard in 706. The Transcoding Delay FIFO memory (612) can delay the locally generated clock in 705 so that the inserted PCR samples are coincident with the original transport stream time stamps which have been delayed by the Transcoder (613). The various actions in method 300 can be performed in the order presented, in a different order or simultaneously. Some actions provided in FIG. 3 can be omitted. Some actions provided in FIG. 3 can be performed in multiple steps. Some actions in method 700 can be performed in the order presented, in a different order, or simultaneously. Further, in some embodiments, some actions listed in FIG. 7 may be omitted.

PCR Clock Recovery and Tracking

In an aspect, the methods provided herein can utilize a stable local clock $\omega_{local}$ with a frequency equal or higher than 27,000,000 Hz to generate a local PCR clock. The formula relating the local clock to the local PCR clock is shown below, where $\omega_{local}$ and $\omega_{PCR}$ represent the clock counts of the local clock and estimated local PCR respectively.

$$\omega_{local} = \alpha + \beta \cdot \omega_{PCR} \quad (1)$$

PCR Clock Data Rollover Normalization

The PCR clock value rolls over to zero after 2,576,980,377, 300 ticks (approximately 26 hours). In order to use the linear equation (1) for conversion between $\omega_{local}$ and $\omega_{PCR}$ clocks, the number of rollovers of PCR clock can be accounted for to produce a contiguous increasing value for $\omega_{PCR}$.

Excessive Jitter Data Point Rejection

The elapsed time between successive PCR clock data points can be used to calculate the average and standard deviation of the number of clock ticks between PCR packet arrivals. If there is excessive jitter in the input data, the actual elapsed time can fall outside of the 3-sigma (99.8% confidence) range of expected value. Data points falling outside this inter-arrival range can be rejected in order to avoid excessive error.

Compensation for IP Transport Packet Clustering

Typically, transport packets can be clustered as 7 packets within a single data-gram IP packet. The $\omega_{local}$ time for all 7 packets can be similar in the cluster. By monitoring the number of transport packets between consecutive PCR values, an accurate value for the PCR clock advance per transport packet can be calculated. This value can then be used to estimate an individual $\omega_{local}$ for each packet in the cluster.

Modified LMS (Least Mean Square) Calculation

The reception and decoding of the input stream PCR values can be subject to error caused by transport stream packet arrival jitter. The corresponding local clock to a PCR value can difficult to obtain due to this arrival jitter.

$$\omega_{local-n} = \alpha + \beta \cdot \omega_{PCR-n} + jitter_n \quad (2)$$

Since jitter error is white noise, its long-term average can be zero. This allows for performance of a regression operation over a large set of $\omega_{local}$ and $\omega_{PCR}$ pairs to co-relate the two sets of clock values with a slope and offset approximation represented as $\alpha$ and $\beta$ values.

$$\sum_{n \to \infty} jitter_n = 0 \quad (3)$$

$$\beta = \frac{(N \cdot \sum \omega_{PCR-i} \cdot \omega_{Local-i} - \sum \omega_{PCR-i} \cdot \sum \omega_{Local-i})}{(\sum \omega_{PCR-i}^2 - \sum \omega_{PCR-i} \cdot \sum \omega_{PCR-i})} \quad (4)$$

$$\alpha = \left(\sum \omega_{Local-i} - \beta \cdot \sum \omega_{PCR-i}\right)/N \qquad (5)$$

Figure 8:
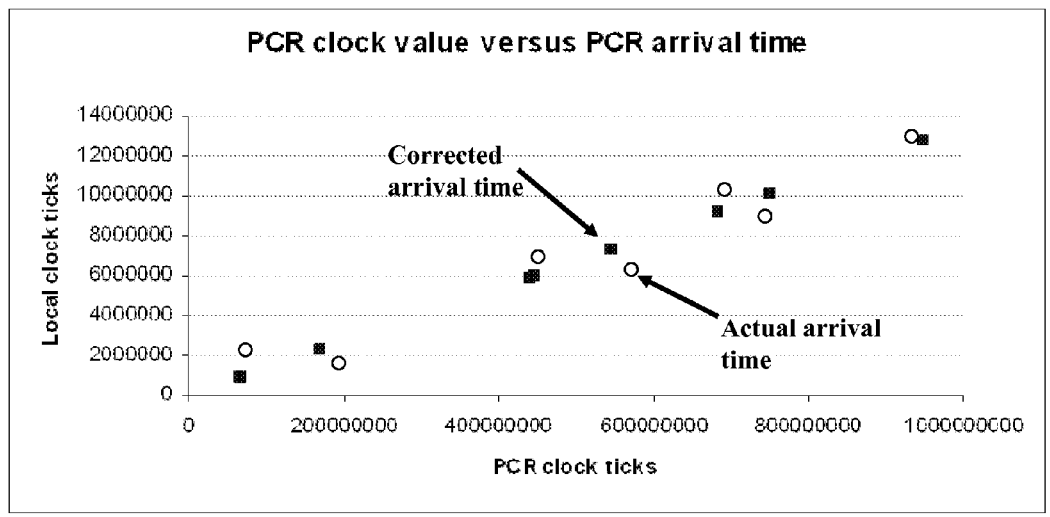
FIG. 8 is a diagram that illustrates a method for correcting the arrival time of PCR clock samples.
Figure 9:
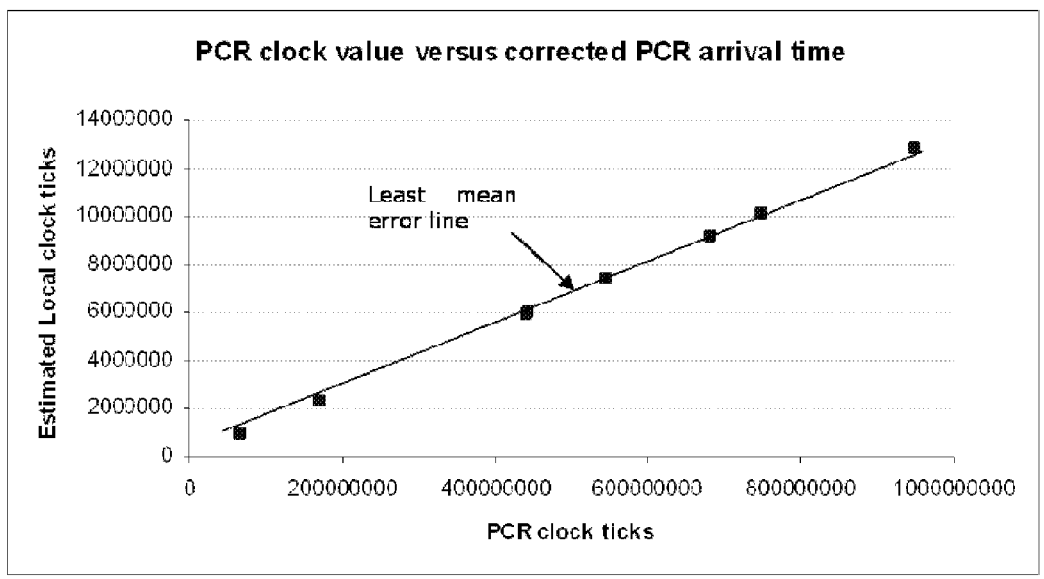
FIG. 9 is a diagram showing the linear estimate of the original PCR clock and the corrected arrival times of the PCR clock samples.

Two regression calculations can be performed. The first regression can produce a better estimate of the $\omega_{local}$ by replacing the arrival $\omega_{local}$ with a $\omega_{local}$ on the regression line corresponding to the value of $\omega_{PCR}$. This can be a better estimate of the actual arrival time as shown in FIG. 8. The second regression determines the line relating the $\omega_{local}$ and $\omega_{PCR}$ as shown in FIG. 9.

Rolling Window of Data Points

The number of samples used in the regression calculations can be limited by discarding the oldest sample and replacing it with the newest in FIFOs (609 and 611). Large numbers of samples can result in more accurate slope and offset calculation. The number of samples can be limited when desired accuracy is achieved, or extended if more PCR value accuracy is needed.

Calculation Round off Error Containment

Round off error can be contained by calculating averages instead of sums (divide by N) as shown in equation (6) and (7).

$$\beta = \frac{\sum(\omega_{PCR-i} \cdot \omega_{Local-i})/N - \sum(\omega_{PCR-i})/N \cdot \sum(\omega_{Local-i})/N}{\sum(\omega_{PCR-i}^2)/N - \sum(\omega_{PCR-i})/N \cdot \sum(\omega_{PCR-i})/N} \qquad (6)$$

$$\alpha = \sum(\omega_{Local-i})/N - \beta \cdot \sum(\omega_{PCR-i})/N \qquad (7)$$

Figure 10:
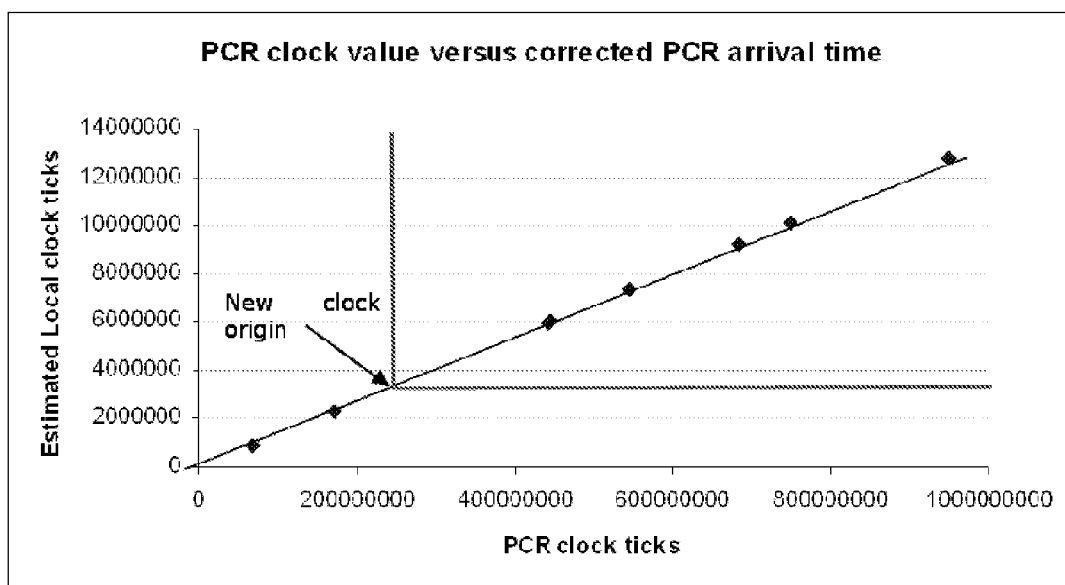
FIG. 10 is a diagram that shows the origin adjustment to prevent overflow of the locally recovered PCR clock.

Variable sizes can be bounded by moving the data point's origin as shown in FIG. 10.

Input and Output PCR Clock Delay

Transcoding can introduce a bounded maximum delay to the transport stream. Therefore the input and output PCR clocks, even though being identical, can be different by a constant pre-determined delay. This method allows exact placement of pass-thru elementary stream on the output buffer as they were received in the input, thereby not violating the buffer model for unknown program elements.

Transcoding

In general, transcoding between dissimilar encoding standards can involve a full decode and re-encode because of incompatibilities between the encoding tools available in the two formats. Two common video encoding standards that exemplify these incompatibilities are MPEG4 and MPEG2. Although both are block based motion compensated standards, MPEG4 has additional tools for prediction and entropy coding, and uses a different transform for encoding spatial frequencies. With respect to encoding quality, the output encoding parameters can be estimated from the original encoding parameters. Although transcoding from MPEG4 to MPEG2 is used as an example, the methods disclosed herein can produce advantages when transcoding between the same standards, such as MPEG2 to MPEG2, or between different standards such as MPEG2 to MPEG4.

Integrated Transcoding

Figure 11:
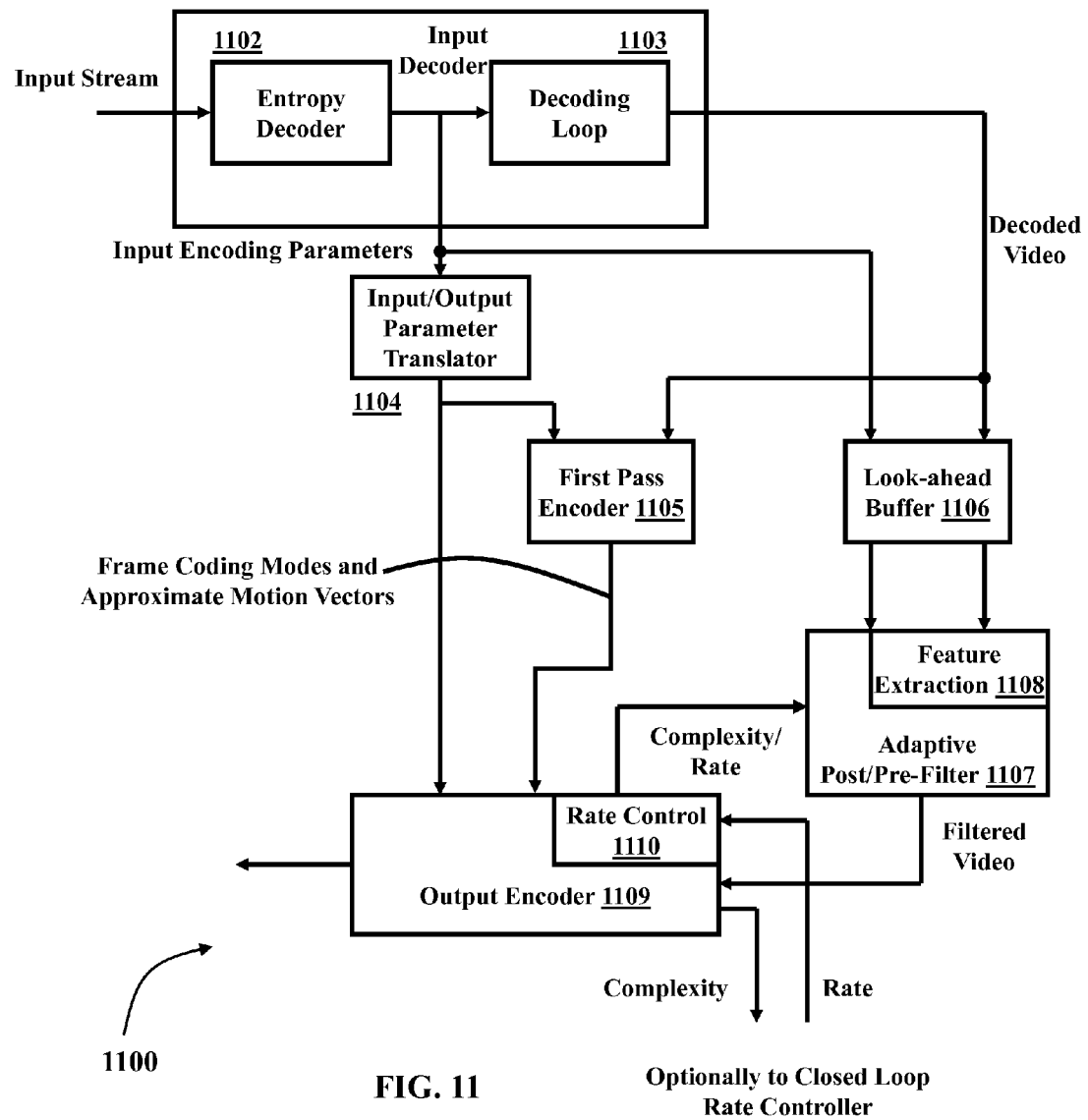
FIG. 11 is a block diagram that illustrates an integrated transcoder according to an embodiment herein.
Figure 12:
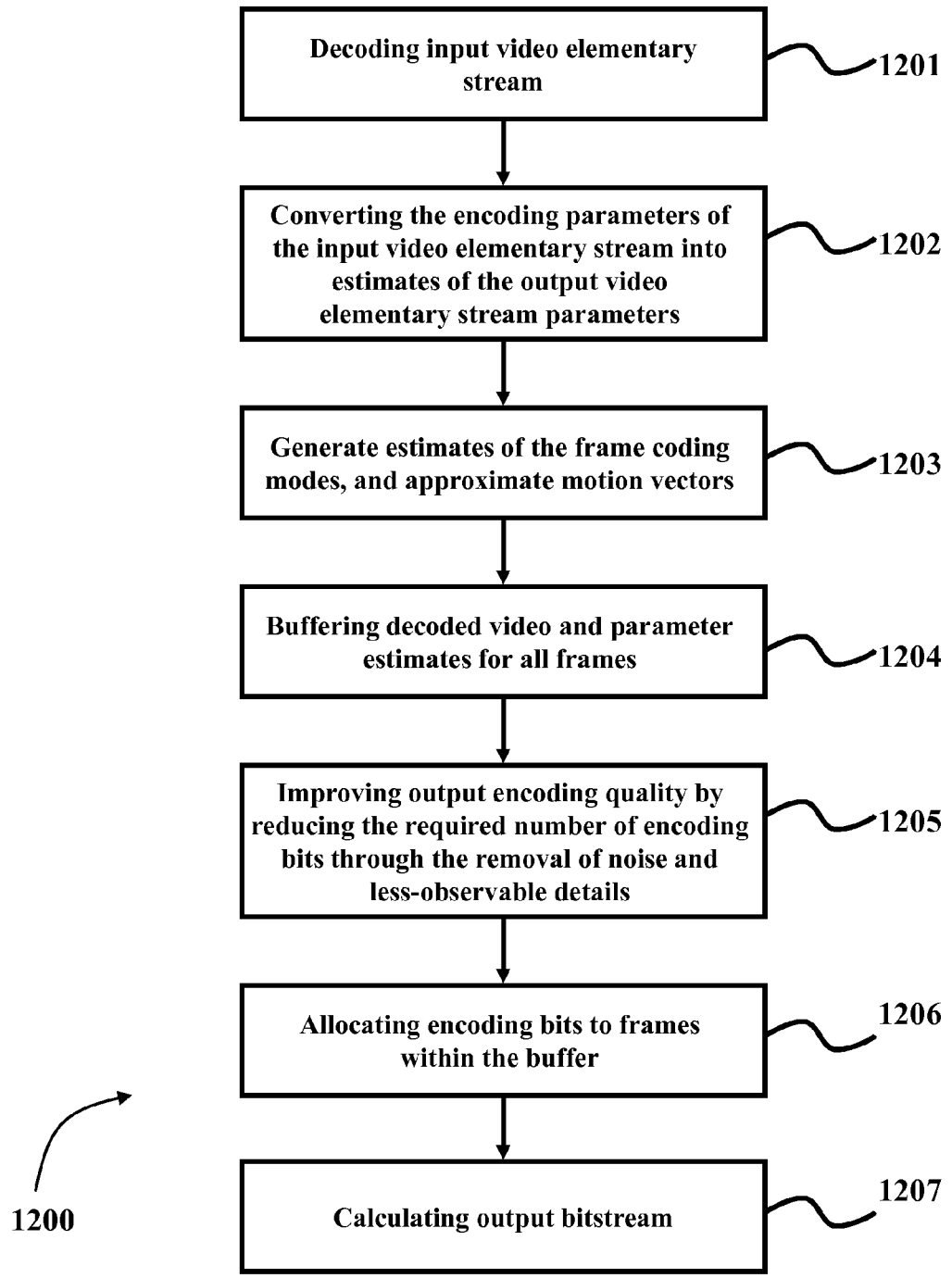
FIG. 12 is a flow diagram that illustrates the method of integrated transcoding according to an embodiment herein.

FIG. 11 is a block diagram that illustrates an Integrated Transcoder and FIG. 12 is a flow diagram that illustrates a method for integrated transcoding. The input video elementary stream is decoded by the Input Decoder (1101) in 1201, which can comprise an Entropy Decoder (1102) and a Decoding Loop (1103). The entropy decoder can recover the original encoding parameters and the decoding loop can reconstruct the video frames which can be subsequently written to a Look-ahead buffer memory (1106). The Input/Output Parameter Translator (1104) can convert the encoding parameters of the input video elementary stream into estimates of the output video elementary stream parameters in 1202 for use by the First Pass Encoder (1105) and Output Encoder (1109). The First Pass Encoder can use the decoded video and the translated input encoding parameters to generate estimates of the frame coding modes, and approximate motion vectors in 1203 for use by the Output Encoder (1109). Parameter estimates for all frames delayed in the look-ahead buffer in 1204 can be available to the output encoder Rate Control (1110) so that it can optimally allocate encoding bits to frames within the buffer while maintaining the required MPEG buffer behavior in 1206. The Adaptive Post/Pre-Filter (1107) can improve the output encoding quality by reducing the required number of encoding bits through the removal of noise and less-observable details as a function of the video complexity and available encoding rate (Complexity/Rate) in 1205. Detail observability can be determined by the Feature Extraction (1108) method that incorporates a human visual system model (HVS), while noise can be estimated from the input encoding parameters and decoded video. The output encoder uses the Filtered Video frame, first pass frame encoding mode, approximate motion vectors, and translated input encoding parameters to calculate the output bitstream in 1207. The complexity estimates from several transcoders can optionally be provided to a closed loop rate controller as shown in FIG. 4. In that case the frame bit allocation can be determined by the closed loop rate controller. The various actions in method 1200 can be performed in the order presented, in a different order or simultaneously. Further, in some embodiments, some actions listed in FIG. 12 can be omitted.

Integrated Transcoding Details

Provided are implementation details for parameter reuse and adaptive post/pre-filtering. A first pass encoder can use the frame type and GOP structure as specified in original encoding parameters unless the first pass encoder detects a transition such as a scene change, or if repeated fields can be detected. Repeated fields occur when the encoded sequence originates from content recorded on film at 24 frames per second. In the case of a scene change intraframe coding is used for the first frame in the new scene. Repeated fields can be dropped from the sequence before encoding and a repeat field symbol is inserted in to the bitstream. The first pass encoder then performs approximate motion estimation (integer displacements) for all macroblocks and all prediction modes using the decoded video frame. The motion vector having the lowest prediction residual for each mode is sent to the output encoder. The output encoder calculates the sub-pixel motion vectors for all prediction modes using the reconstructed video frame. It then performs a rate distortion optimization using the motion vectors from the input encoding parameters along with the calculated motion vectors to determine the final motion vector used. The rate distortion optimization considers the number of bits required to encode each motion vector, and the resultant encoding distortion from the corresponding prediction residual, assuming an equal number of bits can be used for each macroblock. This results in a selection of the macroblock mode, motion vector, and transform type. The prediction residuals can then be quantized to satisfy the frame bit allocation determined from the frame complexities. The quantization matrix from the original encoding parameters is reused, and the minimum quantizer stepsize is limited to be greater than the original stepsize.

Dynamic Parameter Reuse

Figure 13:
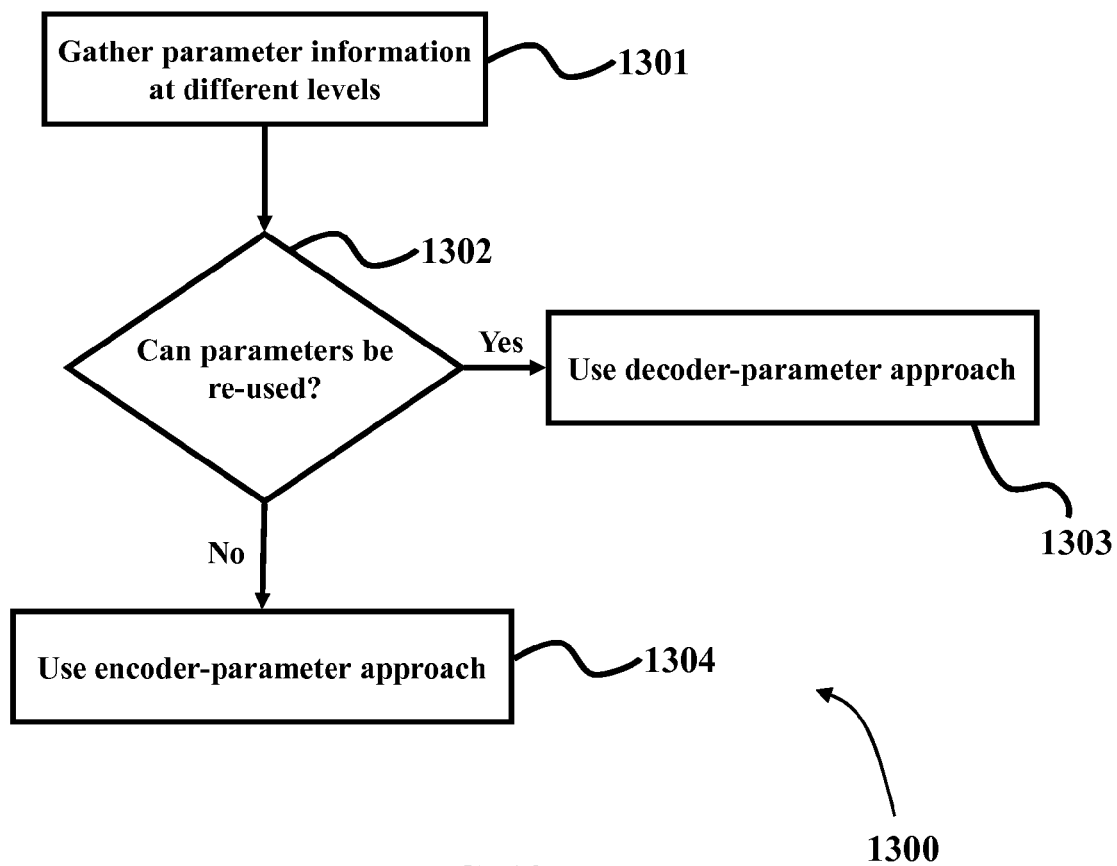
FIG. 13 is a flow diagram illustrating selection of parameter reuse approach according to an embodiment herein.

In a transcoding operation the input bitstream, either MPEG2, H.264 or other compressed bitstream format, is processed to generate an output bitstream. The output bitstream can be either in a different compression standard, or in the same compression standard but at a different bitrate or resolution. In all such transcoding operations, the parameters that can be extracted from the input bitstream can be used to improve the video quality of the output or reduce the computation complexity required to perform the transcoding operation. There can be multiple ways of statically re-using parameters. In the first case, although simplistic, the input stream can be decoded completely to obtain the luminance and chrominance pixels and then re-encoded without re-using any of the parameters. In this approach all the encoding operations like motion estimation, macroblock coding mode decisions can be independently computed by the encoder. This approach can be referred to as the "encoder-parameter" approach. In the second case, all the parameters in the input stream can be completely re-used. This approach can be referred to as the "decoder-parameter" approach. The decoder parameter approach can result in large reduction in computational complexity, but can result in appreciable loss in video quality under certain conditions, e.g., if the output bitrate is substantially lower than the input bitrate. Provided is a third approach, illustrated in FIG. 13, that can combine the benefits of both of the encoder-parameter approach and the decoder-parameter approach by dynamically reusing the parameters of the input bitstream. The decision to use the encoder-parameter or decoder-parameter can be made at different levels of granularity, e.g., GoP (group of picture) or pictures or slice or macroblock. On a GoP level, parameters such as the transcoding ratio, which is the ratio of the output bit rate to the input bit rate, can be used as a criterion for selecting the encoder-parameter or decoder-parameter approach. On a picture level, the decision can be based on the picture type of the current picture, picture type of the reference, the encoding quality (average quantization parameter) of the reference picture. On a macroblock level, the decision can be based on factors such as the residual energy of the quantized coefficients in the input bitstream, quantizer value, and the like. Required information can be gathered at different levels of granularity for analyzing and choosing the approach in 1301. The decision to use one approach or the other can be made by analyzing the information at appropriate granularity levels in 1302. Based on the analysis, if the parameters can be re-used, then the decoder-parameter approach can be used in 1303. Otherwise, the encoder-parameter approach can be used in 1304. The various actions in method 1300 can be performed in the order presented, in a different order or simultaneously. Further, in some embodiments, some actions listed in FIG. 13 can be omitted.

Figure 14:
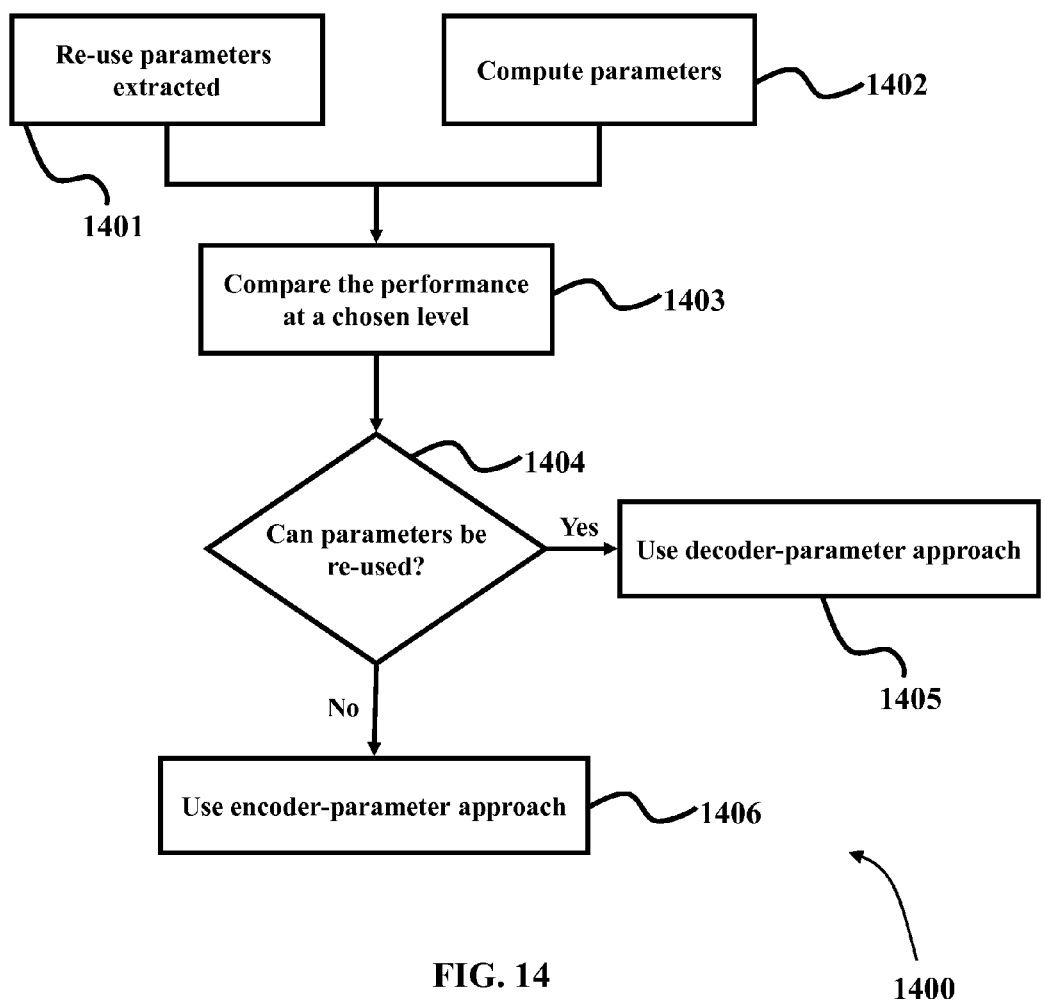
FIG. 14 is a flow diagram illustrating selection of parameter reuse approach according to an embodiment herein.

In another embodiment, both the encoder-parameter approach and the decoder-parameter approach can simultaneously be implemented and the best approach can be selected based on comparison the performance of the two approaches at a macroblock, a picture, or a group of picture level. FIG. 14 illustrates such a method. Both encoder-parameter approach and decoder-parameter approach can be implemented in 1401 and 1402. Their results can be compared at a chosen granularity level at 1403. Based on the comparison a decision is made in 1404. If the parameters can be re-used, then the decoder-parameter approach can be used in 1405. Otherwise, the encoder-parameter approach can be used in 1406. The various actions in method 1400 can be performed in the order presented, in a different order or simultaneously. Further, in some embodiments, some actions listed in FIG. 14 can be omitted.

Complexity Estimation and Bit Allocation

Provided is a method for complexity estimation and bit allocation that allows for a constant bit rate for a set of channels by allocating bit rates to individual channels efficiently. In an aspect, bit allocation to individual channels can be controlled by the output encoder Rate Control (1110) that provides Complexity/Rate input to the Adaptive Post/Pre-Filter (1107). Parameter estimates for all frames delayed in the look-ahead buffer can be available to the output encoder Rate Control (1110) so that the output encoder Rate Control (1110) can optimally allocate encoding bits to frames within the buffer while maintaining the required MPEG buffer behavior. The Adaptive Post/Pre-Filter can make decisions on strength of filtering based on the video complexity and available encoding rate (Complexity/Rate) input obtained from the output encoder Rate Control (1110). For example, when the input bit rate is high and complexity is low (Complexity/Rate ratio is low), the Adaptive Post/Pre-Filter can decide not to filter information. But when the complexity is high and bit rate and output bit rate is low (Complexity/Rate ratio is high), the Adaptive Post/Pre-Filter can adopt stringent filtering mechanism in improving the output encoding quality by reducing the required number of encoding bits through the removal of noise and less-observable details.

Figure 15:
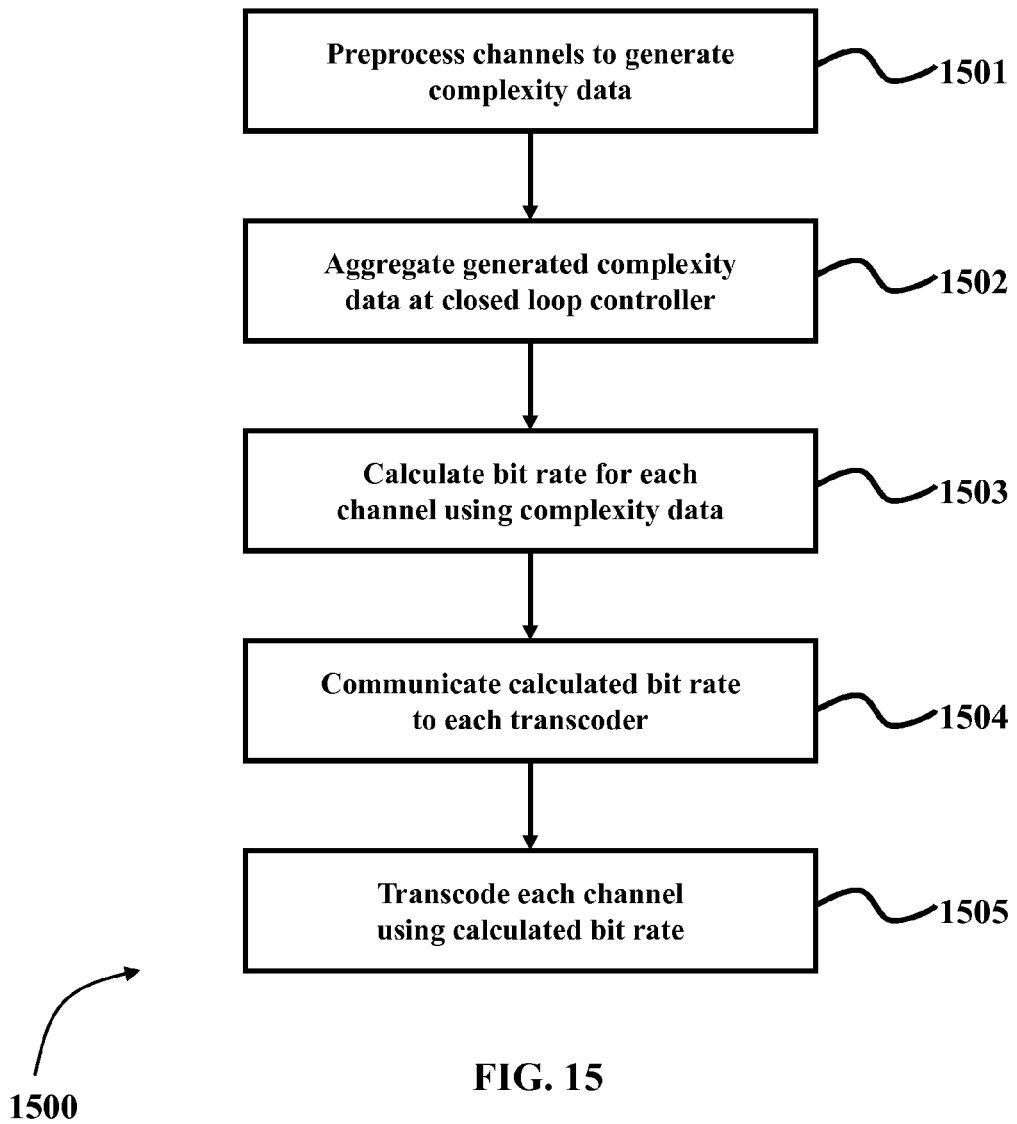
FIG. 15 is a flow diagram illustrating the method of encoding a plurality of data channels using a fixed number of bits according to an embodiment herein.

In an aspect, illustrated in FIG. 15, bit rate allocation to individual channels can be controlled by a Closed Loop Rate Controller (412). The decoded bitstream can be preprocessed using Input/Output Parameter Translator (1104), First Pass Encoder (1105), and Output Encoder Rate Control (1110) to obtain complexity data at each transcoder in 1501. The complexity data from each transcoder can be aggregated at the Closed Loop Rate Controller (412) in 1502. The Closed Loop Rate Controller (412) can calculate the bit rate for each channel using the aggregated complexity data in 1503. The calculated bit rate can be communicated to each transcoder in 1504. The transcoders can encode the bitstream using the calculated bit rate in 1505. The various actions in method 1500 can be performed in the order presented, in a different order or simultaneously. Further, in some embodiments, some actions listed in FIG. 15 can be omitted.

Adaptive Pre-Processing

Adaptive pre-processing is the operation of filtering the uncompressed luminance and chrominance pixels prior to the encoding process. The goal of adaptive pre-processing can be two-fold: (1) Removal of unnecessary noise that is embedded in the input. Presence of the noise can make the input substantially more difficult to code thus consuming a larger bandwidth. (2) Removal of certain features in the input that the human eyes are not sensitive to, therefore increasing the compression efficiency. Adaptive pre-processing needs to be performed in such a way that it does not create other side-effects that cause visual quality degradation. Adaptive pre-processing can be performed using motion compensated temporal filters for noise removal and/or spatial linear/non-linear filters for improving compression efficiency. Several features can be extracted to identify the level of the noise, presence of texture pixels, presence of edge pixels or smooth areas and the filters can be adapted to these features. Thus the strength and nature of these filters can be adapted based on the input content, i.e., in FIG. 4, the filters in each of the transcoders (1, 2 and N) can be dependent on the input content to the respective transcoders.

Closed Loop Transcoding

FIG. 4 is a block diagram of a system incorporating closed loop transcoding. Closed loop transcoding is a method for jointly converting the encoding format and statistically multiplexing a group of program transport streams. The example in FIG. 4 shows the case of video transcoding, however, this is shown for illustration and is not meant to restrict the methods to video only transcoding. Closed loop transcoding can be implemented by the Video Transcoder (507) and the Closed Loop Rate Controller (512). The Closed Loop Rate Controller (512) can receive a complexity estimate for each of the program transport streams being transcoded and multiplexed, and can assign an encoding rate to each of the programs as shown in FIG. 10. The Video Transcoder (507) in turn can convert its input video elementary stream to the output video format at the specified rate. FIG. 11 is a block diagram showing the operation of the Video Transcoder (507). The complexity can be determined by the Output Encoder (1109) and transmitted to the Closed Loop Rate Controller (512) either through a dedicated connection or shared network. The Output Encoder (1109) Rate Control (1110) can use the First Pass Encoder (1105) information and closed loop controller rate to adaptively filter the decoded video and to encode the filtered video at the specified rate.

The methods and systems disclosed optimally perform the statistical multiplexing of transcoded program transport streams by combining the transcoding and rate shaping in a single decoding-encoding stage. The single stage enables the reuse of original encoding parameters and avoids the additive degradation introduced by multiple encoding stages.

The methods and systems disclosed can determine the optimal conversion between encoding formats and the number of bits to assign to each channel of multi-media data, given a fixed number of total bits and a plurality or data channels. The methods and systems disclosed have been illustrated in relation to embodiments which are intended in all respects to be illustrative rather than restrictive.

What is claimed is:

1. A computer implemented method for real time integrated transcoding of a plurality of data channels in an integrated transcoding system comprising a plurality of transcoders, at least a multiplexer, and at least a closed loop rate controller, the method comprising:
   receiving one or more program elementary streams through said plurality of data channels;
   demuliplexing said one or more program elementary streams;
   performing a transcoding operation on said one or more demultiplexed elementary streams, wherein the transcoding operation includes a decoding operation whereby the one or more demultiplexed elementary streams are fully decoded, wherein the decoding operation produces a plurality of encoding parameters and the encoding parameters are dynamically reused by the transcoding operation in reencoding the decoded demultiplexed elementary streams;
   assigning rates to the one or more program elementary streams based on a complexity of a respective stream as estimated by a motion estimator using decoded frames from the respective stream;
   performing a delay operation on said one or more demultiplexed elementary streams to align the one or more program elementary streams;
   buffering said one or more elementary streams in one or more first in, first out (FIFO) memories to time align said streams;
   performing program clock reference (PCR) recovery and tracking to generate a local PCR clock synchronous with original PCR clock for each of said one or more elementary streams; and
   combining said one or more elementary streams with said corresponding PCR clock generated.

2. The method of claim 1, wherein the transcoding operation comprises:
   using an input decoder to decode the video elementary stream to produce a video elementary stream and input encoding parameters;
   converting the input encoding parameters using a parameter translator to produce estimates of transcoded video elementary stream parameters;
   generating estimates of frame coding modes and approximate motion vectors based on the decoded video and estimates of the transcoded video elementary stream parameters;
   buffering the decoded video and input encoding parameters for all frames in a look ahead buffer;
   performing adaptive filtering to improve output encoding quality by reducing a required number of encoding bits through removal of noise and less observable details;
   allocating encoding bits to frames within the look ahead buffer;
   calculating the transcoded video elementary stream.

3. The method of claim 2, wherein the adaptive filtering further comprises filtering the one or more program elementary streams based upon input received from a plurality of transcoders and a closed loop rate controller, wherein the strength and nature of the filtering is based upon the transcoders and the closed loop rate controller.

4. The method of claim 2, wherein the adaptive filtering further comprises:
   sending complexity information from a plurality of transcoders to a closed loop rate controller, the complexity information being associated with each of the streams being processed by the transcoders; and
   receiving at the transcoders an estimated encoding bit rate information for each of the transcoders.

5. The method of claim 4, wherein the transcoders are operable to use the encoding bit rate information and the complexity information to identify filtering attributes associated with the transcoder.

6. The method of claim 5, wherein the filtering attributes comprise strength of filtering and nature of filtering.

7. The method of claim 6, wherein strength of filtering comprises a degree of attenuation in a stopband of a lowpass spatial filter.

8. The method of claim 6, wherein nature of filtering comprises a determination to filter in the spatial domain or filter in the temporal domain.

9. The method of claim 4, wherein frame bit allocation is operable to be controlled by a plurality of output encoder rate control units respectively associated with the plurality of transcoders.

10. The method of claim 2, wherein the input decoder comprises an entropy decoder operable to recover original encoding parameters and a decoding loop operable to reconstruct multimedia frames.

11. The method of claim 1, wherein dynamically reusing parameters comprises:
   receiving parameters at a chosen level of granularity;
   analyzing parameters at the chosen level of granularity;
   comparing parameters for an encoder parameter approach and a decoder parameter approach; and choosing either the encoder parameter or the decoder parameter approach based on the comparison at the chosen level of granularity.

12. The method of claim 1, wherein dynamically reusing parameters comprises:
implementing an encoder parameter approach and a decoder parameter approach;
comparing performance of the encoder parameter approach and the decoder parameter approach at a chosen granularity level; and
selecting either the encoder parameter approach or the decoder parameter approach based upon performance associated with the implemented approaches.

13. The method of claim 4, wherein the complexity information comprises information about timing, frame type, and bit requirements for one or more frame.

14. The method of claim 4, wherein frame bit allocation is operable to be controlled by the closed loop rate controller.

15. A method of program clock reference (PCR recover and tracking that estimates and generates a local PCR clock synchronous with the original PCR clock in a transcoding system, the method comprising:
receiving a subsequence of packets from the input program transport stream, the subsequence of packets comprising PCR clock samples;
comparing the header field of each received packet with the header field PCR indicator;
generating a local PCR clock sample;
storing the PCR value from the input program transport stream in a first in, first out (FIFO memory;
storing a sample of the locally generated PCR value to be stored in a FIFO memory;
performing a transcoding operation on the input program transport stream, wherein the transcoding operation includes a decoding operation whereby one or more demultiplexed elementary streams from the input program transport stream are fully decoded, and wherein the decoding operation produces a plurality of encoding parameters and the encoding parameters are dynamically reused by the transcoding operation in reencoding the decoded demultiplexed elementary streams;
delaying the locally generated clock so that the PCR samples to be inserted into the transcoded stream are coincident with the original transport stream time stamps which have been delayed by the transcoder; and
inserting samples of the local PCR clock into the outgoing program transport stream including the transcoded stream.

16. A system for real time integrated transcoding one or more data channels, the system comprising:
means for receiving one or more program elementary streams through said plurality of data channels;
demuliplexing said one or more program elementary streams;
performing a transcoding operation on said one or more demultiplexed elementary streams, where a strength and nature of filtering is decided cooperatively by a plurality of transcoders and at least a closed loop rate controller, wherein the transcoding operation includes a decoding operation whereby the one or more demultiplexed elementary streams are fully decoded, wherein the decoding operation produces a plurality of encoding parameters and the encoding parameters are dynamically reused by the transcoding operation in reencoding the decoded demultiplexed elementary streams;
performing a delay operation on said one or more demultiplexed elementary streams;
buffering said one or more elementary streams in first in, first out memories to time align said streams;
performing program clock reference (PCR recovery and tracking to generate a local PCR clock synchronous with original PCR clock for each of said one or more elementary streams; and
combining said one or more elementary streams with said corresponding PCR clock generated.

17. A system for program clock reference (PCR recover and tracking that estimates and generate a local PCR clock synchronous with the original PCR clock in a transcoding system, the system comprising at least one means for:
receiving a subsequence of packets from an input program transport stream, the subsequence of packets comprising PCR clock samples;
comparing the header field of each received packet with the header field PCR indicator;
generating a local PCR clock sample;
storing the PCR value from the input program transport stream;
storing a sample of the locally generated PCR value;
performing a transcoding operation on the input program transport stream, wherein the transcoding operation includes a decoding operation whereby one or more demultiplexed elementary streams from the input program transport stream are fully decoded, and wherein the decoding operation produces a plurality of encoding parameters and the encoding parameters are dynamically reused by the transcoding operation in reencoding the decoded demultiplexed elementary streams;
delaying the locally generated clock so that the PCR samples to be inserted into the transcoded stream are coincident with the original transport stream time stamps which have been delayed by the transcoder; and
inserting samples of the local PCR clock into an outgoing program transport stream at intervals, the outgoing program transport stream including the transcoded stream.

* * * * *